Figure 1:
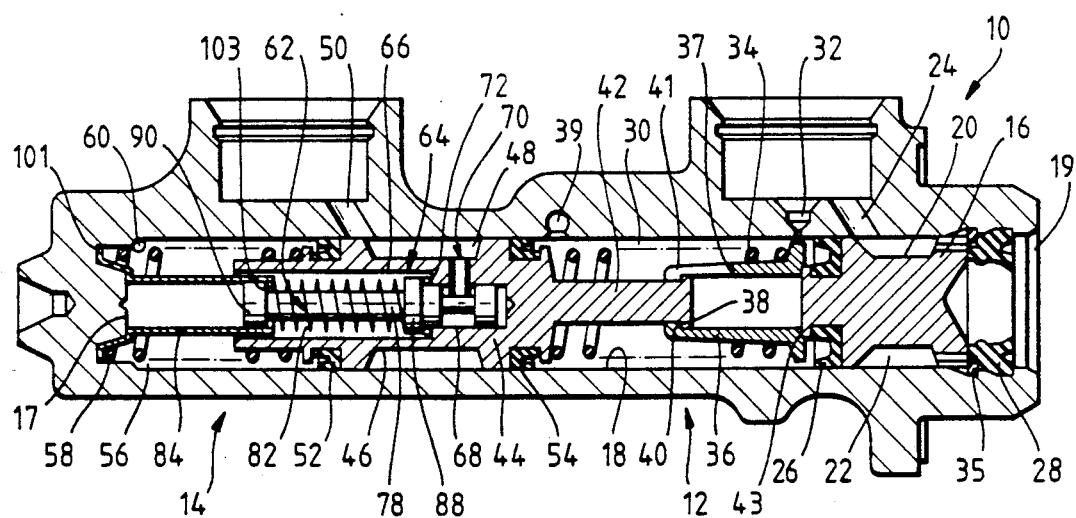

United States Patent

Savidan et al.

Patent Number: 5,111,661
Date of Patent: May 12, 1992

[54] DUAL MASTER CYLINDER

[75] Inventors: Henri Savidan, Luzarches; Andre Vachet, Seugy, both of France

[73] Assignee: General Motors France, Gennevilliers Hauts-de-Seine, France

[21] Appl. No.: 569,327

[22] Filed: Aug. 24, 1990

[30] Foreign Application Priority Data

Sep. 14, 1989 [GB] United Kingdom ............... 8920875

[51] Int. Cl.$^5$ ............................................. B60T 11/28
[52] U.S. Cl. ........................................ 60/562; 60/589
[58] Field of Search ............... 60/533, 562, 585, 588, 60/589

[56] References Cited

U.S. PATENT DOCUMENTS

| 4,455,831 | 6/1984 | Maehara | 60/585 |
| 4,707,989 | 11/1987 | Nakamura et al. | 60/589 |
| 4,709,551 | 12/1987 | Saalbach et al. | 60/589 |
| 4,918,922 | 4/1990 | Nakano et al. | 60/589 |
| 4,932,312 | 6/1990 | Sugimoto | 60/588 |
| 4,998,950 | 3/1991 | Derrick | 60/588 |

FOREIGN PATENT DOCUMENTS

| 941340 | 8/1960 | United Kingdom. | |
| 2207967A | 8/1988 | United Kingdom | 11/20 |
| 2209198A | 8/1988 | United Kingdom | 8/48 |
| 2211567A | 10/1988 | United Kingdom | 11/20 |
| 2219369A | 5/1989 | United Kingdom | 11/16 |

Primary Examiner—Edward K. Look
Assistant Examiner—Hoang Nguyen
Attorney, Agent, or Firm—Ernest E. Helms

[57] ABSTRACT

A dual master cylinder (10) for the braking system of a motor vehicle comprising a primary portion and a secondary portion (14) in which the high pressure chamber (56) of the secondary portion includes a check valve (62) mounted within a piston bore (64) in the secondary piston (44), the piston bore providing a fluid passage (70,96,66) between the high pressure chamber and the low pressure chamber (48) of the secondary portion, the check valve allowing hydraulic fluid to flow through the fluid passage during a rest mode or a release mode of the dual master cylinder, but preventing such flow during an apply mode. Prevents damage to elastomeric cup seal (52) when back-pressure is generated by ABS dus to the absence of a dilation port in the secondary portion, which is no longer required due to the presence of the check valve.

4 Claims, 2 Drawing Sheets

DUAL MASTER CYLINDER

This invention relates to a dual master cylinder for the hydraulic braking system of a motor vehicle. Other dual master cylinders are shown in USSN 391,930, and USSN 07/693,180 Dual Master Cylinder With Compensation and U.S. Pat. No. 5,070,698 Dual Master Cylinder With Compensation Valve filed even date herewith.

Dual master cylinders are well known, and comprise a primary portion and a secondary portion each comprising a low pressure chamber and a high pressure chamber. Each portion also comprises a piston, with the pistons being aligned. The primary piston and the secondary piston are slidably secured together such as to have a maximum relative separation. A primary spring is compressed between the primary piston and the secondary piston. A ring stop, engageable by the primary piston, retains the various components in the dual master cylinder. A secondary spring acts on the secondary piston to bias the pistons towards the ring stop. Each portion is supplied with hydraulic fluid to its low pressure chamber from a reservoir by way of a compensation port. Elastomeric cup seals mounted on the pistons allow passage of hydraulic fluid from the low pressure chambers to the high pressure chambers (but not flow in the reverse direction) to compensate for return movement of the piston and for brake pad or shoe wear. A dilation port connects each high pressure chamber to its respective reservoir to allow excess fluid (generated by thermal expansion, etc.) to flow back to its respective reservoir. The dilation ports are, necessarily, small to reduce the deadstroke of the dual master cylinder (that is, loss of stroke between brake pedal movement and pressure build up), and to reduce the risk of damaging the elastomeric cup seals as they pass over the dilation port opening during movement of the pistons. This arrangement is such that in usual circumstances, on brake pedal depression, the primary piston passes its associated dilation port to seal it from its associated high pressure chamber; the secondary piston then passes its associated dilation port; the fluid pressure in the high pressure chamber of the secondary portion then begins to increase; and then the fluid pressure in the high pressure chamber of the primary portion rises. The use of a dual master cylinder in a motor vehicle provides two independent hydraulic circuits (a primary circuit and a secondary circuit integral with the primary portion and the secondary portion respectively) for the braking system. This ensures that the brakes can still be applied even in the event that one of the circuits should fail, such as due to a leakage of hydraulic fluid.

Whilst this known arrangement works satisfactorily on motor vehicles having a standard braking system, problems can arise on motor vehicles fitted with ABS (anti-lock braking systems), and in particular to back-pressure ABS in which hydraulic fluid can be pumped back to the high pressure chambers during operation of ABS. This action can result in very high fluid pressures being generated within the high pressure chambers. If, when ABS comes into operation, an elastomeric cup seal is positioned over a dilation port opening, the high pressure in the high pressure chamber can force the cup seal into the dilation port and damage it. Any such damage can result in a failure in at least one of the circuits. In usual arrangements, the primary piston passes its corresponding dilation port before the secondary piston passes its corresponding dilation port on application of the vehicle brakes. During ABS operation, therefore, it is more likely that the elastomeric cup seal on the secondary piston would be damaged, rather than the cup seal on the primary piston. Suitable alternative arrangements have been proposed, but these have tended to involve extending the length of the master cylinder.

It is an object of the present invention to overcome the above mentioned problem.

To this end, a dual master cylinder in accordance with the present invention comprises a bore having an open end and a closed end; a primary portion including a primary piston slidable in the bore, a low pressure chamber within the bore and defined by the shape of the primary piston, and a compensation port opening into the low pressure chamber and connectable with a primary fluid reservoir; and a secondary portion including a secondary piston slidable in the bore, a low pressure chamber within the bore and defined by the shape of the secondary piston, and a compensation port opening into the low pressure chamber and connectable with a secondary fluid reservoir; the primary portion including a high pressure chamber within the bore between the primary piston and the secondary piston, and the secondary portion including a high pressure chamber within the bore between the secondary piston and the closed end of the bore; a seal being mounted on the primary piston between the low and high pressure chambers of the primary portion; a seal being mounted on the secondary piston between the low and high pressure chambers of the secondary portion; the high pressure chamber of the primary portion being fluidly connectable with the primary fluid reservoir by dilation means; the high pressure chamber of the secondary portion including a check valve mounted within a piston bore in the secondary piston, the piston bore providing a fluid passage between the high pressure chamber and the low pressure chamber of the secondary portion, the check valve allowing hydraulic fluid to flow through the fluid passage during a rest mode or a release mode of the dual master cylinder, but preventing such flow during an apply mode.

In the present invention, the check valve performs the function of the previously known dilation port for the secondary portion, and also provides a means for compensating for any reduction of hydraulic fluid in the high pressure chamber in the secondary portion. By removing the previously known dilation port from the secondary portion, potential damage of the seal on the secondary piston is removed.

The seal on the secondary piston is preferably an elastomeric cup seal. In this case, both the elastomeric cup seal and the check valve can provide the compensating effect. The seal on the primary piston is preferably an elastomeric cup seal.

Preferably, the check valve comprises a check valve piston slidably mounted in the piston bore and having a first abutment face engageable with a shoulder in the piston bore to prevent flow of hydraulic fluid through the fluid passage on actuation of the respective piston. In this case, an elastomeric ring seal is preferably positioned between the first abutment face and the shoulder.

Preferably, the piston bore comprises a large diameter portion which opens into the high pressure chamber of the secondary portion and a small diameter portion, the shoulder being positioned between the large diameter portion and the small diameter portion; an aperture extends through the secondary piston between the small diameter portion and the low pressure chamber of the secondary portion; and the check valve piston comprises a main body positioned within the large diameter portion of the piston bore, and a secondary body slidably positioned in the small diameter portion of the piston bore, the first abutment face being positioned between the main body and the secondary body, the secondary body having a channel in its surface; the fluid passage being defined by the aperture, the channel, and the large diameter portion. In this case, the secondary body preferably has a reduced diameter portion adjacent the aperture through the secondary piston, and a hollow pin is positioned in the aperture to project into the small diameter portion of the piston bore.

The check valve piston is preferably biased towards the secondary piston by a piston spring acting on a second abutment face on the check valve piston.

The maximum separation of the first abutment face and the shoulder is preferably restricted by a third abutment face on the check valve piston engaging stop means positioned within the piston bore.

Preferably, where the seal on the primary piston is an elastomeric cup seal, the dilation means in the primary portion is a dilation port. Alternatively, the dilation means may be a check valve means.

Figure 2:
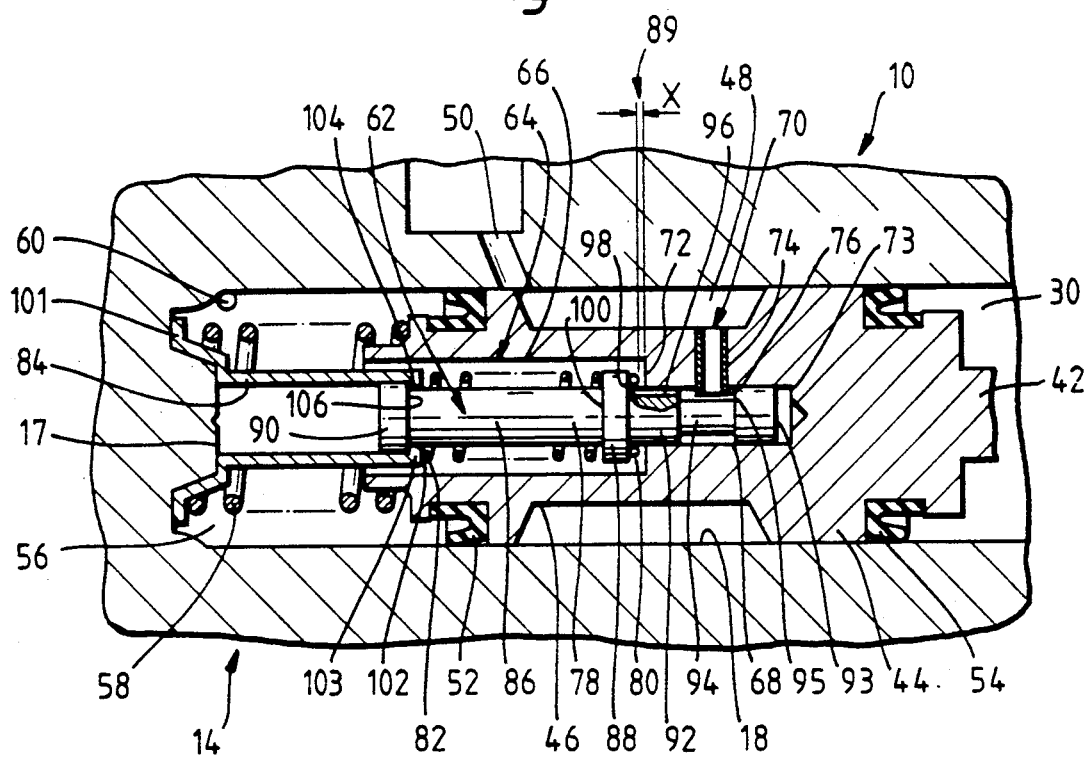
Figure 3:
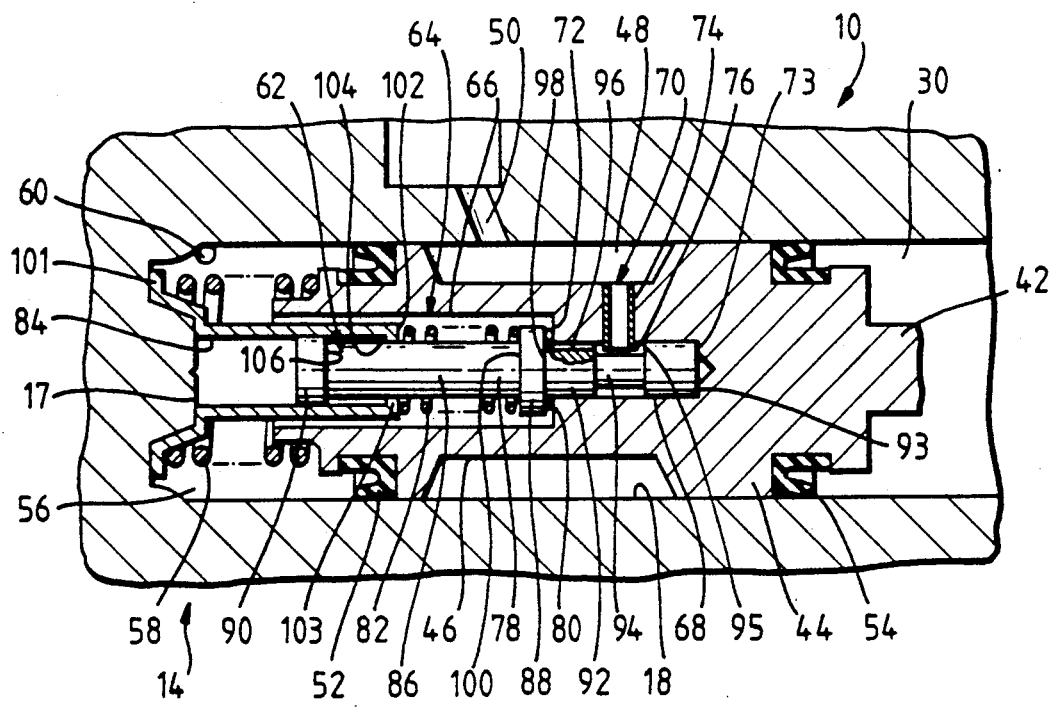

The present invention will now be described, by way of example, with reference to the accompanying drawings, in which: FIG. 1 is a cross-sectional view of a dual master cylinder in accordance with the present invention;

FIG. 2 is an enlarged cross-sectional view of part of the dual master cylinder shown in FIG. 1 in the rest mode; and FIG. 3 is a similar view to that of FIG. 2 with the dual master cylinder in the apply mode.

Referring to FIG. 1, the dual master cylinder 10 comprises a primary portion 12 and a secondary portion 14. The primary portion 12 is connected to, and is part of, a primary circuit of the braking system of a motor vehicle. Similarly, the secondary portion 14 is connected to, and is part of, the secondary circuit of the braking system.

The primary portion 12 comprises a primary piston 16 axially slidable within a bore 18 having a closed end 17 and an open end 19 in the dual master cylinder 10, and movable by a pushrod (not shown) actuated by the vehicle operator by pressing on the brake pedal (not shown) of the braking system. The pushrod passes through the open end 19 of the bore 18 to act on the primary piston 16. The primary piston 16 has a reduced diameter portion 20 between its ends to define a low pressure chamber 22 within the bore 18 for the primary portion 12. The primary portion 12 also includes a high pressure chamber 30 within the bore 18. The low pressure chamber 22 is connected to a primary fluid reservoir (not shown) by way of a compensation port 24. An elastomeric cup seal 26 which moves with the primary piston 16 allows hydraulic fluid to flow from the low pressure chamber 22 to the high pressure chamber 30 to compensate for pressure differentials between the low and high pressure chambers 22,30 respectively, on return movement of the primary piston 16 (after application of the brakes), and for brake pad or shoe wear. The elastomeric cup seal 26, however, prevents flow of hydraulic fluid from the high pressure chamber 30 back to the low pressure chamber 22. The high pressure chamber 30 is connected to the primary fluid reservoir by way of a dilation port 32 in a rest mode of the primary piston 16, that is, when the brake pedal is not depressed. The dilation port 32 allows excess hydraulic fluid (generated by thermal expansion, etc.) to flow back to the primary fluid reservoir to ensure there is no residual fluid pressure in the high pressure chamber 30. A ring stop 35 mounted in the bore 18 adjacent the open end 19 retains the primary piston 16 within the bore. An elastomeric cup seal 28 positioned between the ring stop 35 and the open end 19 provides a fluid tight seal between the pushrod and the bore 18 of the dual master cylinder 10. A spring retainer cage 36 is mounted within the high pressure chamber 30. A number of resilient fingers 41 extend away from one end 37 of the spring retainer cage 36, each of which has a lip 38 engageable with a shoulder 40 on an extended portion 42 of a secondary piston 44 (described in more detail below). The lips 38 on the resilient fingers 41 make a snap fit over the shoulder 40 on the extended portion 42 to secure the spring retainer cage 36 to the secondary piston 44, but to allow the spring retainer cage to slide along the extended portion 42. A primary spring 34 is precompressed and positioned between the secondary piston 44 and the spring retainer cage 36. The primary spring 34 biases the other end 43 of the spring retainer cage 36 into engagement with the primary piston 16. This arrangement is such that, in the rest mode, the primary spring 34 holds the primary and secondary pistons 16,44 respectively at a predetermined maximum separation. An outlet port 39 connects the high pressure chamber 30 with the other components (not shown) of the primary circuit of the braking system.

The secondary portion 14 comprises the secondary piston 44, the extended portion 42 of which extends into the high pressure chamber 30 of the primary portion 12. The secondary piston 44 is also slidably mounted in the bore 18 (such that it is axially aligned with the primary piston 16), and has a reduced diameter portion 46 between its ends defining a low pressure chamber 48 within the bore 18 for the secondary portion 14. A compensation port 50 connects the low pressure chamber 48 with a secondary fluid reservoir (not shown). The secondary portion 14 also includes a high pressure chamber 56 within the bore 18. Elastomeric cup seals 52,54 are mounted on the secondary piston 44 to move therewith. One of the elastomeric cup seals 52 allows hydraulic fluid to flow from the low pressure chamber 48 to the high pressure chamber 56, but not in the reverse direction, to compensate for pressure differentials between the low and high pressure chambers 48,56 respectively, on return movement of the secondary piston 44 (after application of the vehicle brakes). Similarly, the other elastomeric cup seal 54 allows hydraulic fluid to flow from the low pressure chamber 48 to the high pressure chamber 30 of the primary portion 12, but not in the reverse direction. A secondary spring 58 is positioned within the high pressure chamber 56 and acts on the secondary piston 44 to bias an assembly of the secondary piston, primary spring 34, spring retainer cage 36, and primary piston 16 towards the open end 19 of the bore 18. The primary piston 16 engages the ring stop 35 in the rest mode to retain the assembly in the bore 18. The primary spring 34 is stronger than (usually of the order of twice as strong) the secondary spring 58 to ensure the whole assembly moves together on initial application of the vehicle brakes, as described below. An outlet port 60 in the high pressure chamber 56 provides a fluid connection with the other components of the secondary circuit.

The dual master cylinder 10 as thus far described is known. When the brake pedal (not shown) is depressed to apply the vehicle brakes, the pushrod acts on the primary piston 16 to move the primary piston, the spring retainer cage 36, and, due to the primary spring 34 being stronger than the secondary spring 58, the secondary piston 44 relative to the bore 18 away from the open end 19 against the action of the secondary spring. Such movement of the secondary piston 44 pressurises the hydraulic fluid in the high pressure chamber 56 to apply the vehicle brakes by way of the secondary circuit. Further, such movement of the primary piston 16 isolates the dilation port 32 from the high pressure chamber 30, and pressurises the hydraulic fluid in the high pressure chamber 30 to apply the vehicle brakes by way of the primary circuit. Release of the brake pedal causes the above movement to be reversed. However, the biasing effect of the secondary spring 58 is such that the secondary and primary pistons 44,16 respectively may move back quicker than the returning hydraulic fluid. To compensate for the 'shortfall' in hydraulic fluid in the high pressure chambers 30,56, hydraulic fluid flows past the elastomeric cup seals 26,52 respectively from the low pressure chambers 22,48 respectively. Similarly, any shortfall of hydraulic fluid in the high pressure chambers 30,56 due to wear of the brake pads or brake shoes can be compensated for in this way. Any build up in fluid pressure in the high pressure chamber 30 (due to thermal expansion etc.) when the dual master cylinder 10 is in the rest mode is dilated to the primary fluid reservoir by way of the dilation port 32.

In accordance with the present invention, the secondary portion 14 also includes a check valve 62 (FIGS. 2 and 3). The check valve 62 is positioned within a piston bore 64 in the secondary piston 44. The piston bore 64 comprises a large diameter portion 66 which opens into the high pressure chamber 56, and a small diameter portion 68 which opens at one end into the large diameter portion 66, and which is connected to the low pressure chamber 48 by way of an aperture 70 through the secondary piston 44. A shoulder 72 connects the large diameter portion 66 with the small diameter portion 68 at said one end of the small diameter portion. An end wall 73 closes the other end of the small diameter portion 68. A hollow pin 74 is positioned in the aperture 70 and projects into the small diameter portion 68 of the piston bore 64 to provide an abutment face 76 (abutment means). The check valve 62 comprises a check valve piston 78, an elastomeric ring seal 80, a piston spring 82, and a piston stop and spring support 84. The check valve piston 78 comprises a main body 86 positioned within the large diameter portion 66 of the piston bore 64, and having a collar portion 88,90 at each end, and a secondary body 92 extending from one end of the main body, and making a sliding fit in the small diameter portion 68 of the piston bore. The secondary body 92 has an end face 93 directed towards the end wall 73 of the small diameter portion 68. The secondary body 92 also has a reduced diameter portion 94 adjacent the aperture 70 connected with a channel 96 extending along the surface of the secondary body. The reduced diameter portion 94 defines a shoulder 95 (shoulder means) on the secondary body 92 which is directed towards the abutment face 76 on the hollow pin 74. The collar portion 88 between the main body 86 and the secondary body 92 defines opposed first and second abutment faces 98,100 respectively. The elastomeric ring seal 80 is positioned around the secondary body 92 adjacent the first abutment face 98. The piston stop and spring support 84 is retained in position by the secondary spring 58 engaging one end 101 thereof, extends around the main body 86, and defines a support face 102 directed towards the second abutment face 100 at the other end 103 thereof. The piston spring 82 (which is weaker than the secondary spring 58) is positioned within the large diameter portion 66 of the piston bore 64, and extends between, and engages, the support face 102 and the second abutment face 100 to bias the check valve piston 78 towards the secondary piston 44. The piston stop and spring support 84 also has a lip 104 (stop means) facing the opposite direction to the support face 102, which is engageable by a third abutment face 106 defined by the collar portion 90 at the other end of the main body 86 to limit the axial extent of the piston spring 82, and thereby restrict the movement of the check valve piston 78 relative to the secondary piston 44.

In the rest position shown in FIG. 2, the secondary piston 44 is biased away from the closed end of the bore 18 by the secondary spring 58, and the check valve piston 78 is biased towards the secondary piston by the piston spring 82. However, the third abutment face 106 on the collar portion 90 engages the lip 104 on the piston stop and spring support 84 to restrict the relative movements of the check valve piston 78 and the secondary piston 44. As a consequence, a gap 89 having a predetermined size X exists between the first abutment face 98 on the collar portion 88 and the shoulder 72 defined by the piston bore 64, and hydraulic fluid can flow between the secondary fluid reservoir and the high pressure chamber 56 by way of compensation port 50, low pressure chamber 48, aperture 70 (hollow pin 74), channel 96, and the large diameter portion 66 of the piston bore 64. Aperture 70, channel 96, and large diameter portion 66 thereby define a fluid passage between the low pressure chamber 48 and the high pressure chamber 56.

When the brake pedal (not shown) is depressed (to apply the vehicle brakes), the secondary piston 44 moves, as detailed above, towards the closed end 17 to compress the secondary spring 58 (FIG. 3). However, due to the biasing force of the piston spring 82, the check valve piston 78 does not move relative to the closed end 17 of the bore 18. When the secondary piston 44 has moved a distance X equal to the gap 89, the elastomeric ring seal 80 engages both the first abutment face 98 on the collar portion 88 and the shoulder 72 in the piston bore 64. Further movement of the secondary piston 44 compresses the elastomeric ring seal 80 to form a fluid tight seal between the first abutment face 98 and the shoulder 72, and hence seals the fluid passage 70,96,66. Still further movement of the secondary piston 44 towards the closed end 17 pressurises the hydraulic fluid in the high pressure chamber 56 to apply the vehicle brakes by way of the secondary circuit. During this action, the end wall 73 of the piston bore 64 engages the end face 93 of the check valve piston 78 to prevent over-compression of the elastomeric ring seal 80 (to prevent damaging it), and to move the check valve piston 78 and the secondary piston 44 together. Further, the other end 103 of the piston stop and spring support 84 moves relative to the main body 86 of the check valve piston 78 (within the large diameter portion 66 of the piston bore 64) to compress the piston spring 82.

When the braking effort is released, the pressure of the hydraulic fluid and the bias of the secondary spring 58 and piston spring 82 act on the secondary piston 44 and the check valve piston 78 to move them back to the rest position shown in FIG. 2. However, as the surface area of the secondary piston 44 acted on by the hydraulic fluid is greater than that of the check valve piston 78, and as the secondary spring 58 exerts a greater force than that of the piston spring 82, the secondary piston 44 may move quicker than the check valve piston 78. As a consequence, the gap 89 between the first abutment face 98 and the shoulder 72 begins to reopen until the third abutment face 106 on the collar portion 90 engages the lip 104 on the piston stop and spring support 84, and until the primary piston 16 engages the ring stop 35 to stop further movement of the above described assembly, including the secondary piston 44, at which point the gap 89 returns to its predetermined size X.

The biasing effect of the secondary spring 58 is such that the secondary piston 44 may move back quicker than the returning hydraulic fluid. The early reopening of the gap 89 allows hydraulic fluid to flow from the low pressure chamber 48 into the high pressure chamber 56 to compensate for this initial shortfall or lack of hydraulic fluid in the high pressure chamber. Further, the gap 89 allows passage of hydraulic fluid from the secondary fluid reservoir into the high pressure chamber 56 to compensate for a shortfall of hydraulic fluid in the high pressure chamber 56 due to wear of the brake pads or brake shoes. This compensating effect enhances the same effects provided by the elastomeric cup seal 52. Further still, the gap 89 allows reverse flow (dilation) of hydraulic fluid should there be an unintentional build up of fluid pressure in the high pressure chamber 56 due to thermal expansion, etc. The gap 89 therefore fulfils the same purpose as the dilation port 32 of the primary portion 12, and no such port is required in the secondary portion 14. Where the braking system includes ABS, when ABS operates a flow of hydraulic fluid is sent back to the high pressure chamber 56 increasing the fluid pressure therein. As no dilation port is present in the secondary portion 14, no damage can occur to the elastomeric cup seal 52.

The abutment face 76 on the hollow pin 74 is provided for two reasons. Firstly, if the piston spring 82 breaks, the abutment face 76 will engage the shoulder 95 on the secondary body 92 to still provide operation of the check valve 62. Further, the engagement of the abutment face 76 against the shoulder 95 allows all of the components of the dual master cylinder within the bore 18 to be assembled as a complete sub-assembly prior to insertion in the bore.

As well as overcoming the problems associated with prior known dual master cylinders, the present invention has the additional advantage that all of the components within the bore 18 of the dual master cylinder 10 can be assembled as a complete sub-assembly prior to insertion in the bore, and can be inserted in any orientation as there is no requirement to align the sub-assembly with a component inserted through the housing of the dual master cylinder (which also means there is no possibility of fluid leakage around this component). Further still, the check valve arrangement can be incorporated into the dual master cylinder without any increase in its length, and the arrangement is very simple.

Whilst the present invention has been described in regard to a dual master cylinder having a check valve in the secondary portion only, a check valve may also be positioned in the primary portion 12 to replace the dilation port 32. The check valve may be a suitably modified version of the above described check valve or of the check valve described in our other patent application no. USSN 07/693,180, filed the same day as the present application. Preferably, however, the check valve used in the primary portion is as described in our U.S. Pat. No. 5,070,698 also filed the same day as the present appiication.

We claim:

1. A dual master cylinder for the braking system of a motor vehicle comprising a bore having an open end and a closed end;

a primary portion including a primary piston slidable in the bore, a low pressure chamber within the bore and defined by the shape of the primary piston, and a compensation port opening into the low pressure chamber and connectable with a primary fluid reservoir;

and a secondary portion including a secondary piston slidable in the bore, a low pressure chamber within the bore and defined by the shape of the secondary piston, and a compensation port opening into the low pressure chamber and connectable with a secondary fluid reservoir;

the primary portion including a high pressure chamber within the bore between the primary piston and the secondary piston, and the secondary portion including a high pressure chamber within the bore between the secondary piston and the closed end of the bore;

a seal being mounted on the primary piston between the low and high pressure chambers of the primary portion;

a seal being mounted on the secondary piston between the low and high pressure chambers of the secondary portion;

the high pressure chamber of the primary portion being fluidly connectable with the primary fluid reservoir by dilation means;

the high pressure chamber of the secondary portion including a check valve mounted within a piston bore in the secondary piston, the piston bore providing a fluid passage between the high pressure chamber and the low pressure chamber of the secondary portion, the piston bore comprising a large diameter portion which opens into the high pressure chamber of the secondary portion and the piston bore comprising a small diameter portion, a piston bore shoulder being positioned between the piston bore large diameter portion and the piston bore small diameter portion, the piston bore also having end wall means within the piston bore small diameter portion, the check valve allowing hydraulic fluid to flow through the fluid passage during a rest mode or a release mode of the dual master cylinder, but preventing such flow during an apply mode;

wherein the check valve comprises a check valve piston and a ring seal positioned around the check valve piston, the check valve being slidably mounted in the piston bore and having a first abutment face adjacent the ring seal engageable with the ring seal which is in turn engageable with the shoulder in the piston bore to prevent flow of hydraulic fluid through the fluid passage on actuation of the respective piston;

wherein an aperture extends through the secondary piston between the small diameter portion and the low pressure chamber of the secondary portion and a hollow pin is positioned in the aperture to project into the small diameter portion of the piston bore, the pin forming an abutment means with the second portion of the piston bore;

ary portion and a hollow pin is positioned in the aperture to project into the small diameter portion of the piston bore, the pin forming an abutment means with the second portion of the piston bore;

and wherein the check valve piston comprises a main body positioned within the large diameter portion of the piston bore, and a secondary body slidably positioned in the small diameter portion of the piston bore, the first abutment face being positioned between the main body and the secondary body, the secondary body having a channel in its surface and wherein the check valve piston secondary body has an end face for contact with the piston bore end wall means to limit movement of the check valve piston first abutment face towards the piston bore shoulder to limit the compression of the ring seal, and wherein the check valve piston secondary body has a reduced diameter portion adjacent the aperture, the reduced diameter portion defining a shoulder on the check valve piston secondary portion for engagement with the pin to limit the relative position of the piston first abutment face away from the secondary piston bore shoulder, and the piston main body portion having a second abutment face facing generally opposite the first abutment face and a third abutment face on an end of the main body more adjacent the master cylinder closed end facing in the same direction as the first abutment face, the third abutment face being contained within the secondary valve piston;

a piston spring support and stop spring within the secondary portion spring biased away from the secondary piston by a secondary spring, the piston spring support being positioned adjacent the master cylinder closed end, the piston spring support having stop means for engagement with the check valve piston third abutment face to limit the displacement of the check valve piston away from the piston spring support and stop thereby set the maximum distance of the check valve piston first abutment from the piston bore shoulder, and the piston spring support and stop being spring biased away from the check valve via engagement of a piston check valve spring contact with the check valve piston second abutment face;

the fluid passage being defined by the aperture, the channel, and the large diameter portion of the piston bore.

2. A dual master cylinder as claimed in claim 1, wherein the seal on the primary piston is an elastomeric cup seal.

3. A dual master cylinder as claimed in claim 1, wherein the dilation means in the primary portion is a dilation port.

4. A dual master cylinder as claimed in claim 1, wherein the dilation means in the primary portion is a check valve means.

* * * * *